United States Patent

Berry et al.

[15] 3,668,524
[45] June 6, 1972

[54] ELECTRONIC CIRCUIT FOR DETECTING AND EVALUATING ANGULAR ACCELERATION AND DECELERATION OF A ROTARY MEMBER

[72] Inventors: James I. Berry, Livonia; Zbigniew J. Jania, Northville, both of Mich.

[73] Assignee: Ford Motor Company, Dearborn, Mich.

[22] Filed: Jan. 19, 1970

[21] Appl. No.: 3,667

[52] U.S. Cl. ..........................................324/162, 188/181 A
[51] Int. Cl. ................................................................G01p 3/42
[58] Field of Search.....................324/16 L, 78 R, 78 D, 78 Z; 307/132, 140, 141; 340/262; 235/92 A, 151.32, 150.3, 150.31, 150.2; 303/21 C, 21 BB, 21 CG, 21 CE; 188/181 A

[56] References Cited

FOREIGN PATENTS OR APPLICATIONS 960,999   6/1964   Great Britain..........................324/162

Primary Examiner—Michael J. Lynch
Attorney—John R. Faulkner and Donald J. Harrington

[57] ABSTRACT

An electronic circuit for developing a voltage signal that is proportional in magnitude to the acceleration or deceleration of a rotary member, including a speed pick-up signal generator connected to the rotary member and having an output signal in the form of voltage pulses, a plurality of voltage storage counters, each being connected to an output signal amplifier circuit, a separate electronic gate for controlling the entry of a triggering voltage signal to each of said storage counters and a multi-vibrator switching circuit connecting the input side of each gate with the output side of said speed pick-up whereby the signal generated by said speed pick-up is selectively distributed to the gates to allow each storage counter to develop an output signal voltage that is determined by the number of pulses generated by said pick-up within a predetermined interval, the differences in voltages stored by each counter thereby being a measure of the change in velocity of said rotary member during operation in one interval relative to the speed of the rotary member during operation in another interval.

8 Claims, 5 Drawing Figures

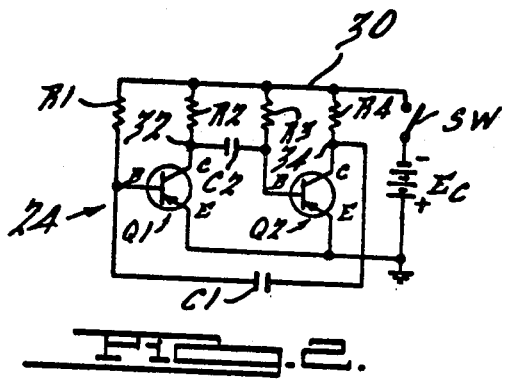
FIG. 2.
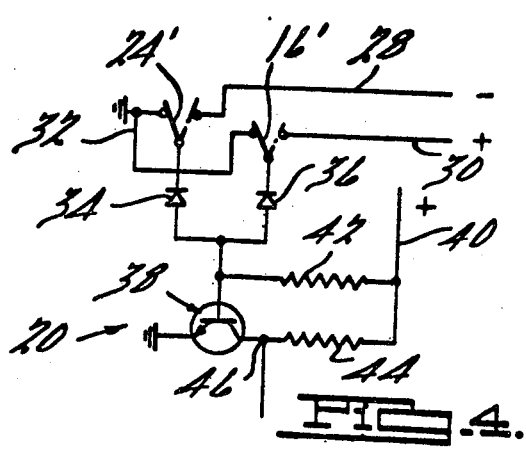
FIG. 4.
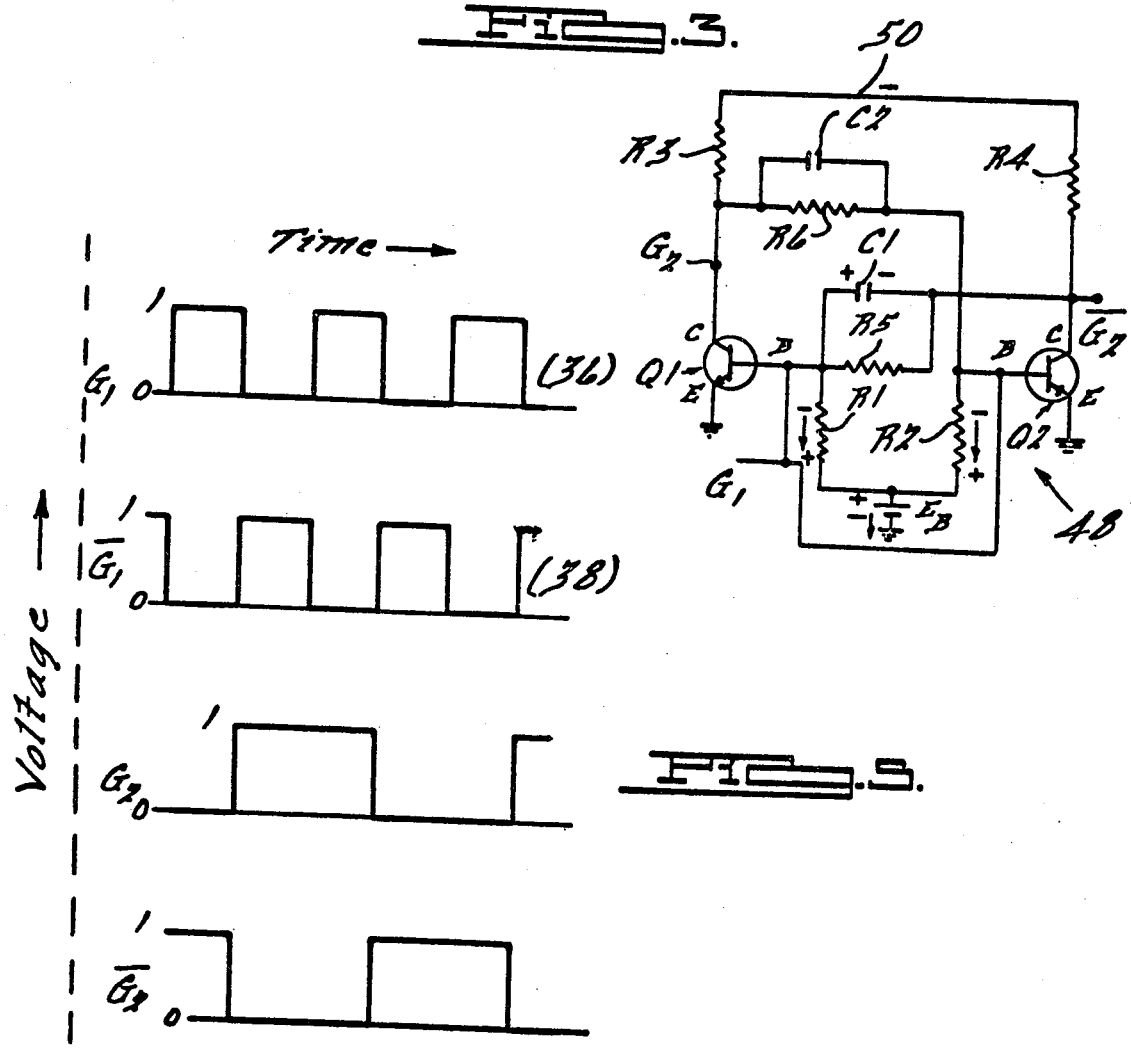
FIG. 3.
FIG. 5.

3,668,524

ELECTRONIC CIRCUIT FOR DETECTING AND EVALUATING ANGULAR ACCELERATION AND DECELERATION OF A ROTARY MEMBER

GENERAL DESCRIPTION OF THE INVENTION

Our invention is adapted especially to be used in antidkid brake systems for wheeled vehicles having individual wheel brakes. It may be used in such an environment to detect angular deceleration of one of the vehicle wheels. The antiskid brake system uses this signal, together with an appropriate vehicle speed signal and a wheel brake pressure signal, to control or modulate the magnitude of a wheel braking force in order that wheel slippage at the wheel-road interface will not exceed a predetermined design value. My invention can be used in other circuitry, however, where angular acceleration or deceleration parameters are desired.

The acceleration or deceleration signals that are produced depends upon the frequency of voltage pulses developed by a reluctance voltage pick-up device drivably connected to a rotary member. In the case of an antiskid brake system, the rotary member would be the vehicle wheel to be controlled. An astable multi-vibrator of a predetermined, constant frequency develops pulse signals of square wave form which are directed to each of a pair of electronic gates. The same gates receive the voltage pulses from the reluctance pick-up. The output side of each gate receives voltage pulses when the multivibrator output is in the so-called "1" state and the output side of the gate is isolated from the reluctance pick-up when the associated signal from the multivibrator is in the "0" state. The output from each of these gates is distributed to each of two pairs of similar gates. The other input signal for each of these gates is received from a flip-flop circuit that is triggered by one of the voltage signals from the multivibrator. One side of the flip-flop circuit is connected to one of a pair of other gates, and the other side of the flip-flop circuit is connected to the other pair of the other gates. Each of these other gates in turn forms an input signal source for a separate one of four storage counters.

The gate circuit causes the storage counters to be selectively triggered so that each counter functions during one-quarter of the total time required for one complete cycle of the vibrator. The ultimate source for each of the storage counters is the reluctance pick-up. Thus the voltage developed in each counter during the portion of the operating cycle in which it is operational is determined by the number of pulses developed by the reluctance pick-up during that time portion, which in turn is an indicator of the instantaneous angular velocity of the rotary member. By comparing the voltage developed in one storage counter with the voltage developed in the next storage counter that is operational in the sequence, an indication of the change of velocity is detected. This is useful as an indication of acceleration or deceleration.

As the next pair of voltage counters becomes operational, the first pair of voltage counters is deactivated and conditioned for a subsequent reluctance pick-up voltage pulse count as the operating cycle is repeated.

DESCRIPTION OF THE FIGURES OF THE DRAWING

FIG. 2 shows in schematic form an astable multivibrator capable of being used in the circuit of FIG. 1.

FIG. 3 shows a flip-flop bistable multivibrator capable of being used in the circuit of FIG. 1.

FIG. 4 shows in schematic form a so-called "not and" gate for use in the circuit of FIG. 1.

FIG. 5 shows the signal voltage wave forms developed by the astable multivibrator of FIG. 2 and the bistable multivibrator of FIG. 3.

PARTICULAR DESCRIPTION OF THE INVENTION

Figure 1:
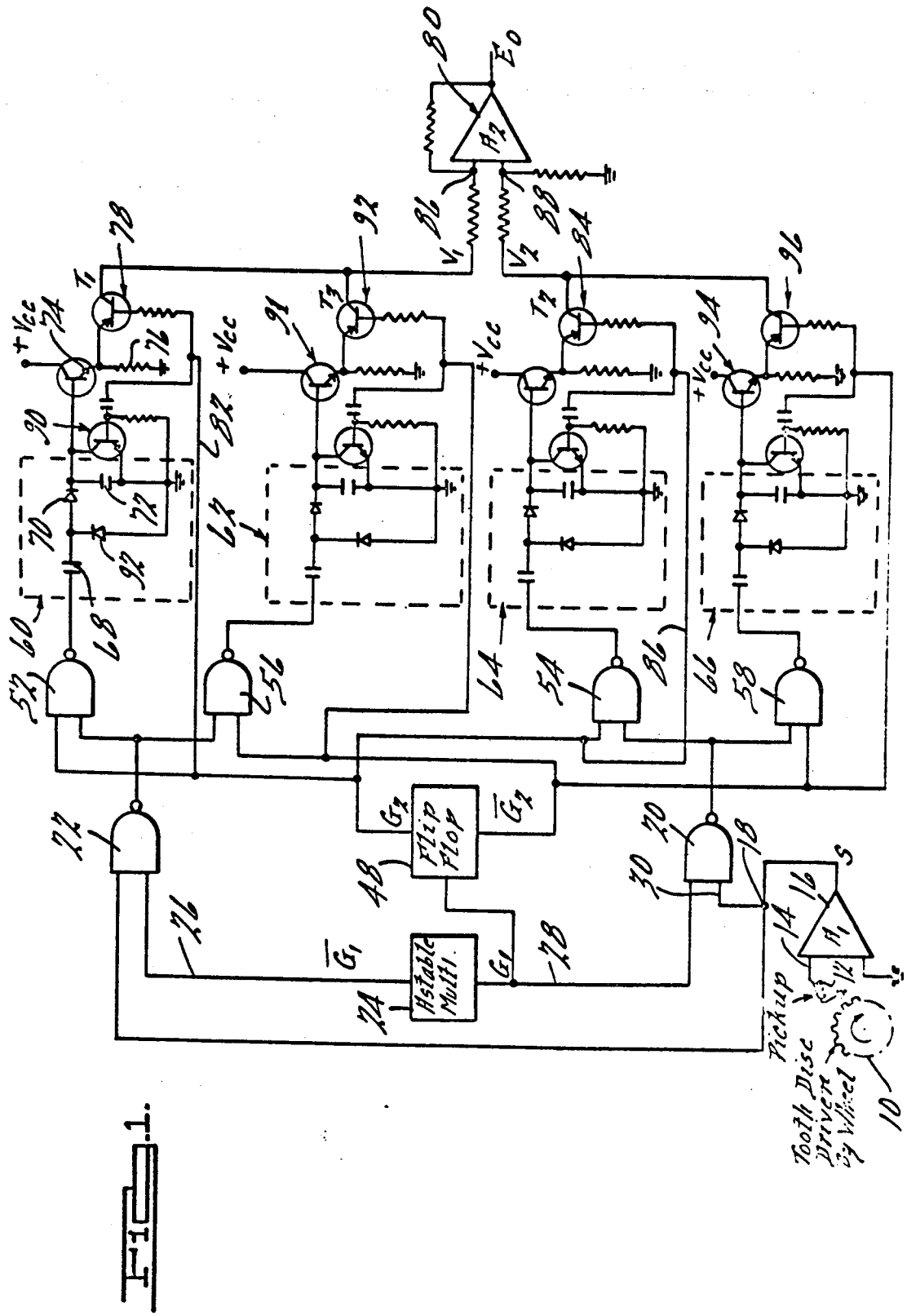
FIG. 1 shows a schematic electronic circuit embodying the elements of my invention.

FIG. 1 shows at 10 a toothed disc which is driven by a driven member. As indicated earlier, this driven member may be the road wheel of a wheeled vehicle. The teeth on the disc 10 pass through the inductance field of an inductance coil 12 thereby causing voltage pulses in lead 14. The frequency of the pulses generated by the instantaneous changes in the reluctance of the coil 12 is related directly to the speed of rotation of the disc 10. These voltage pulses are amplified by a conventional amplifier subcircuit 16 to produce a useful output signal at point 18 on its output side. Point 18 is connected to the input side of a first gate 20 as well as to the input side of a second gate 22.

An astable multivibrator 24 produces voltage pulses at each of its two output sides. One output side is connected to the gate 22 through line 26 and the other output side is connected to the gate 20 through line 28. Line 26 receives gate signal $\overline{G}_1$ from one side of the multivibrator 24 and line 28 receives a second gate signal $G_1$ from the other side of the multivibrator 24.

For purposes of illustration, one form of multivibrator that would be useful in the circuit of FIG. 1 is shown in FIG. 2. It includes two PNP transistors $Q_1$ and $Q_2$ having a common emitter circuit. The $Q_2$ is coupled to the base or input side B of the $Q_1$ stage. The voltage drop across $R_4$ in FIG. 2 can be used as one of the voltage output signals such as $\overline{G}_1$. The voltage drop across resistor $R_2$ in FIG. 2 can be used as the output voltage signal for the other stage. This may be the gate signal $G_1$.

Line 30 in FIG. 1 forms a supply line and is connected to a voltage source $E_C$ through a suitable switch S. It will be assumed that the characteristics of the transistors are such that transistor $Q_1$ conducts more readily than does $Q_2$. The collector voltage at point 32 for the transistor $Q_1$ then falls to a value that is lower than the corresponding value at point 34 for the transistor $Q_2$. Capacitor $C_2$, which couples the input for the $Q_2$ stage to the output side of the $Q_1$ stage, then discharges through the collector-emitter circuit for $Q_1$, which circuit includes the resistor $R_3$. This places a reverse bias on the base-emitter circuit for $Q_2$, thereby causing $Q_2$ to be non-conductive.

Capacitor $C_1$ at this time becomes charged by the base emitter-circuit for $Q_1$ and resistor $R_4$, thereby adding forward bias current to the $Q_1$ input. This causes $Q_1$ to reach its saturation level.

The voltage on capacitor $C_2$ falls off as it continues to discharge and the base voltage bias for $Q_2$ becomes less positive. When the bias on $Q_2$ reaches zero, $Q_2$ forward bias current begins to flow from the voltage source $E_C$ through resistor $R_3$. This causes the collector circuit for $Q_2$ to conduct. As this occurs, the voltage at point 34 falls and capacitor $C_1$ discharges through the collector-emitter circuit for $Q_2$ and resistor $R_1$. This flow of current, due to the discharge of capacitor $C_1$, places a reverse bias on the base-emitter circuit of $Q_1$ causing it to stop conducting. Capacitor $C_2$ then recharges by virtue of its connection with the base-emitter circuit of $Q_2$ and the connection through $R_2$. The recharged capacitor $C_2$ increases the forward bias on the $Q_2$ input. This then causes the transistor $Q_2$ to reach its saturation level.

This process continues, thereby producing square wave voltage pulses in alternate sequence. These pulses are indicated by the symbols $\overline{G}_1$ and $G_1$ in FIG. 1. They are graphically represented in charts 36 and 38 of FIG. 5. It is seen that when the signal $G_1$ goes from the "0" state to the "1" state, the signal $\overline{G}_1$ goes from the represented 1" state to the "0" state. Conversely, when signal $\overline{G}_1$ goes from the "0" state to the "1" state, the signal $G_1$ goes from the "1" state to the "0" state. Time is plotted in the charts of FIG. 5 along the abscissa and voltages are plotted along the ordinate.

The astable multivibrator 24 serves as a switching circuit for the gates 20 and 22. For the purpose of indicating the function of these gates 20 and 22, reference may be made to FIG. 4 where gate 20 is illustrated in schematic form. The other gates may be duplicates of this.

The output signal $G_1$ for the astable multivibrator 24 is distributed to gate 20 through line 28, but for the purposes of FIG. 4 the voltage pulses may be thought of as the result of opening and closing a mechanical switch shown at 24'. In a similar fashion the output signal from the reluctance pick-up is distributed to the gate 20 through line 30, but for purposes of FIG. 4 the voltage pulses may be thought of as being established by opening and closing a second mechanical switch 16'.

A common side for each of the switches is grounded as shown at 32. The other terminal of switch 24' is connected to the output side of a first diode 34. Similarly, the other terminal of the switch 16' is connected to the output side of a second diode 36.

An NPN transistor 38 is connected at its base to the input sides of the diodes 34 and 36. The base also is connected to supply line 40 through resistor 42. The collector circuit for the transistor 38 is connected to the supply line 40 through resistor 44.

Whenever switch 24' is in the "0" state, current will flow from line 40 through resistor 42 producing a voltage drop across the resistor. The current flows then through diode 34 and switch 24' to the ground. There is no base-emitter voltage bias across transistor 38 at this time because of the voltage drop across resistor 42. Thus there is no current in resistor 44 and the output voltage measured at point 46 is zero. Switch 16' can move between the "0" state and the "1" state without having any influence on the output voltage at point 46.

If switch 24' should move to the "1" state and switch 16' should move to the "0" state, there again will be a reverse bias on the transistor 38, thereby preventing a voltage signal at point 36 from developing. If the switch 16' should move to the "1" state, current flow through resistor 42 is interrupted and the base-emitter voltage increases, thereby triggering the transistor 38 and producing a voltage drop across resistor 44. This causes a voltage signal at point 46 to be developed. That voltage signal, however, is in the opposite direction from the signal direction for the supply lines. It is seen, therefore, that if either switch is in the "0" state, the output voltage at point 46 is zero. If one of the switches is in the "1" state and the other switch moves between the "0" state and the "1" state, the voltage signal at point 46 will move between the "1" state and the "0" state as the sign of the voltage signal is reversed. It is seen, therefore, that whenever the astable multivibrator 24 develops a signal $G_1$, which would correspond to movement of switch 24' to the "1" state, voltage pulses are established by the inductance pick-up 16, which would correspond to the rapid movement of switch 16' between the "0" state and the "1" state. The output voltage measured at point 46 will be a pulsating voltage of the same frequency but of opposite sign from the voltage pulses developed by the reluctance pick-up 16. The voltages pulses of the pick-up 16 are not transmitted through the gate, however, when the astable multivibrator 24 does not develop a signal $G_1$.

The operation of the gate 22 in response to the signal $\overline{G_1}$ is the same as that previously described with respect to gate 20 and the signal $G_1$. In other words, gate 22 will distribute the voltage pulses of pick-up 16 only when the signal $\overline{G_1}$ is available.

Signal $G_1$ is the input signal for the flip-flop bistable multivibrator 48. This is shown in detail in FIG. 3. The circuit of FIG. 3 includes two transistors $Q_1$ and $Q_2$ of the PNP type. The collector circuit for each transistor is supplied with voltage from a common line 50 which has a negative potential. The input signal $G_1$ is applied to the bases of transistors $Q_1$ and $Q_2$. The output signals for the bistable multivibrator 48 are $G_1$ and $G_2$. These are measured across resistors $R_3$ and $R_4$, respectively. These are located in the collector circuits for the transistor $Q_1$ and $Q_2$, respectively.

In the circuit of FIG. 3, $Q_1$ conducts when $Q_2$ is turned off and $Q_1$ is turned off when $Q_2$ conducts. The change from one condition to the other is triggered by the voltage pulse $G_1$.

If it is assumed at the outset that no voltage signal $G_1$ is present, and if it is assumed that transistor $Q_1$ conducts current more readily than transistor $Q_2$, voltage signal $G_2$ will result because of the voltage drop across resistor $R_3$. This voltage drop reduces the voltage applied to the divider circuit shown at $R_6$, $R_2$ and voltage source $E_B$. This voltage source has a potential that is greater than the voltage drop across resistor $R_2$. Thus a reverse bias is applied to the base of the transistor 48, and current through the collector circuit for the transistor 48 is cut off. Voltage is measured at that point. Signal $G_2$ thus rises to a value almost equal to the voltage in line 50. This results in an increased voltage across the divider $R_5$ and $R_1$. The voltage drop across $R_1$ exceeds the voltage $E_B$ thus placing a forward bias on the $Q_1$ base-emitter circuit. Transistor $Q_1$ thus conducts heavily at its saturation level. This is a stable condition which will not be changed unless the stability is upset. The equilibrium is upset by the application of signal $G_1$ to the base of the transistor $Q_1$. If it is assumed that this pulse is positive, the current in $R_1$ is reduced and the collector current in transistor $Q_1$ also is reduced. Voltage $G_2$ increases because of the smaller voltage drop across $R_3$, and the voltage supplied to the divider $R_6$ and $R_2$ increases. This results in a forward bias on the transistor $Q_2$ causing collector current in transistor $Q_1$ to increase. The voltage signal $\overline{G_2}$ falls due to the increased current in $R_4$ and less voltage then is applied to the divider $R_5$ and $R_1$. The voltage drop across $R_1$ thus falls below $E_B$ and $Q_1$ is cut off. This also is a stable condition which will continue as long as the voltage pulse $G_1$ continues.

The signal $G_2$ developed by the bistable multivibrator 48 is distributed to gate 52 and to gate 54. The signal $\overline{G_2}$ is distributed to gates 56 and 58.

Gates 52 and 56 receive a second input signal from gate 22, and gates 54 and 58 receive a second input signal from the gate 20. Each of the gates 52, 56, 54 and 58 operates in the same manner as the gate 20 which was described with reference to FIG. 4. The output side of each gate 52, 56, 54 and 58 is connected to the input side of a separate voltage storage counter as indicated, respectively, at 60, 62, 64 and 66.

The frequency of the output signal for the bistable multivibrator 48 is exactly one-half of the frequency of its input signal. Thus for each pulse of the $G_2$ signal, for example, two pulses for the input signal are required. The same is true for the output signal $\overline{G_2}$. The relationship between the wave forms for each of the four signals $\overline{G_1}$, $G_1$, $G_2$ and $\overline{G_2}$ is illustrated in FIG. 5 where voltage is plotted on the ordinate and time is plotted on the abscissa.

The output side of each gate 52, 56, 54 and 58 will be conditioned to receive selectively the voltage pulses supplied by the reluctance pick-up 10. During the time in which the gate for any particular storage counter is open, the storage counter receives the voltage pulses and stores them in its internal capacitance. This develops an output signal voltage which is a measure of the average velocity of the driven member during the interval in which the gate is open. The timing of the gates, of course, is fixed at a constant value determined by the frequency inherent in the astable multivibrator 24.

Since the storage counters are identical, only one of them, namely counter 60, will be described here.

The capacitor 68 has one side connected to the output side of the gate 52. It receives pulses from the reluctance pick-up when both $\overline{G_1}$ and $G_2$ are in the "1" state. Similarly, because of the action of the gate 54, storage counter 64 will receive pulses only when both $G_1$ and $G_2$ are in the "1" state. When $G_1$ goes to the "0" state, gate 54 is closed, as explained previously. Similarly, if $\overline{G_1}$ goes to the "0" state, gate 52 is closed, as explained previously.

Because the frequency of the pulses $G_2$ and $\overline{G_2}$ are exactly one-half the frequency of the pulse in $G_1$ and $\overline{G_1}$, gate 52 will be opened during the first one-half of the time $G_2$ is in the "1" state and gate 54 will be opened during the last one-half of the time in which $G_2$ is in the "1" state. It is apparent, therefore, that both the storage counters 60 and 64, at the end of the time in which $G_2$ is in the "1" state, will have stored a voltage charge. If the speed of rotation of the driven member associated with the reluctance pick-up does not change, those stored voltages will be the same. If a speed change occurring during the time in which $G_2$ remains in the "1" state, the voltages stored by counters 60 and 64 will be different.

The voltage charge developed by a single impulse distributed through the gate 52 is transferred through a rectifying diode 70 to one side of storage capacitor 72. The other side of capacitor 72 is grounded. This produces a base-emitter voltage bias on NPN transistor 74 which causes a collector current to flow through resistor 76.

A switching transistor 78 and the transistor 74 have a common emitter circuit. The collector circuit for the transistor 78 is connected to the input side of an output amplifier 80. The base of the transistor 78 receives the signal $G_2$ through line 82. The voltage drop across resistor 76, because of the forward bias imparted to the base-emitter circuit for transistor 74, will not produce a forward bias on the transistor 78 because signal $G_2$ is applied to the base for the transistor 78. This signal exceeds the voltage drop across resistor 76.

Diode 70 allows transfer of the pulse signals received by the capacitor 68 to the storage capacitor 72, thereby developing in steps a voltage potential. This potential is not dissipated, however, until the gate signal $G_2$ assumes a "0" state, thereby removing the reverse bias on the transistor 78.

The same signal $G_2$ that kept transistor 78 from conducting is applied to the base for transistor 84 on the output side of the storage counter 64. The base for transistor 84 is connected to the signal source for $G_2$ through line 86.

As mentioned earlier, both counters 60 and 64 develop charges during the time in which the signal $G_2$ is present. As soon as the signal $G_2$ assumes the "0" state, both transistors 84 and 78 begin to conduct, thereby distributing the signals from counters 60 and 64 simultaneously to the amplifier 80.

The storage voltage represented by the symbol $V_1$ is distributed to the amplifier 80 at one input point 86 and the input storage voltage $V_2$ for the counter 64 is distributed to the amplifier 80 at input point. The amplifier 80 substracts the voltage values and amplifies the differential voltage to produce a resultant voltage $E_0$, which is a measure of the change in velocity that occurs during the time required to complete one-half cycle for the bistable multivibrator 48.

The capacitor 72, which induced the signal that was received by the amplifier 80 is discharged by a capacitor bypass passage defined by transistor 90. Whenever a signal $G_2$ is present, the base for transistor 90 receives a reverse bias which prevents collector current from flowing through the transistor 90 around the capacitor 72. After the signal $G_2$ assumes a "0" state and the collector 60 distributes its stored voltage signal to the amplifier 80, the potential existing across capacitor 78 is dissipated through the collector circuit for the transistor 90.

A rectifying diode 92 is interposed between one side of the capacitor 70 and output side of the capacitor 68. As capacitor 68 receives at its input side the pulses during the time that $G_2$ is in the "1" state, the pulses themselves will oscillate back and forth between the "1" state and the "0" state. As soon as a pulse assumes the "1" state, capacitor 68 begins to discharge through diode 70 to the storage capacitor 72. When the pulse goes to the "0" state, the charge on capacitor 68 will be less than it was during the initiation of the "1" state for the preceding pulse. In order to prevent the output side of the capacitor 68 from assuming a negative charge when the pulse itself assumes the "0" state, the diode will provide a connection with ground. This will prevent reduction of the charge on the output side of the capacitor 68 to a potential less than zero.

The counters 62 and 66 have suitable switching transistors 91, 92, 94 and 96, respectively. These correspond to the switching transistors previously described for the counters 60 and 64.

Storage counters 60 and 64 are discharged when $G_2$ goes from the "0" state to the "1" state, as explained previously. In a similar fashion storage counters 62 and 66 are discharged when $G_2$ goes from the "0" state to the "1" state.

Each storage counter receives pulses for one-quarter of the period of the astable multivibrator 24 or one-half of the period for the bistable multivibrator 48. Storage counter 60 receives pulses when both $\overline{G_1}$ and $G_2$ are in the "1" state, as explained previously. Similarly, storage counter 64 receives pulses when both $G_1$ and $G_2$ are in the "1" state. Storage counter 62 receives pulses when both $G_2$ and $G_1$ are in the "1" state. Storage counter 66 receives pulses when both $G_2$ and $G_1$ are in the "1" state.

The storage counters are charged in the sequence 60, 64, 62 and 66.

The amplifier 80 substracts the voltage output of counter 60 from the voltage output of counter 64 when $G_2$ is in the "0" state. Amplifier 80 substracts the voltage output of counter 60 from the voltage output of counter 64 when $G_2$ is in the "0" state. Amplifier 80 substracts the voltage output of counter 62 from the voltage output of counter 66 when $\overline{G_2}$ is in the "0" state. One of these pairs of counters is in condition for accumulating voltages when the storage capacitors for the other pair of counters is being erased or dissipated prior to a subsequent voltage accumulation as the previously described cycle is repeated. The average voltage $E_0$ at any instant thus provides an instantaneous reading of the acceleration of the rotary member.

Having thus described a preferred form of our invention, what we claim and desire to secure by U.S. Letters Patent is:

1. An angular accelerometer adapted to measure the angular acceleration of a rotary member comprising a velocity pick-up means for developing voltage pulses having a frequency that is proportional in magnitude to the rotary speed of said member, an astable multivibrator circuit means for developing voltage pulses at each of two output sides thereof, a bistable vibrator circuit means for developing in alternating sequence two additional voltage pulses, two electrical gates each having two input terminals and one output terminal, a separate one of the output sides of said astable multivibrator circuit means being connected to one input terminal of each of said gates, four additional gates, each having a pair of input terminals and a single output terminal, one input terminal of each of a first pair of said four additional gates being connected to the output side of one of said first mentioned gates, a second pair of said four additional gates having an input terminal connected to the output terminal of the other of said first mentioned gates, a first output side of said bistable multivibrator circuit means being connected to one terminal of one of said first pair of gates and to one terminal of said second pair of gates and the second side thereof being connected to one terminal of one of the other of said one pair of gates and to one terminal of one of the other of said other pair of gates, four storage voltage counters, a separate one of a first pair of said counters being connected to the output terminal of each of said first pair of said four additional gates, a separate one of a second pair of said counters being connected to the output terminal of each of said second pair of said four additional gates, one storage counter of each of said pair of storage counters being connected through their respective gates to a first output side of said bistable multivibrator circuit means whereby they accumulate voltage charges when a signal is available from said bistable multivibrator circuit means, the second output side of said bistable multivibrator circuit means being connected to the other of each of said pairs of storage counters through their respective gates, said counters accumulating voltage charges when a signal is available from said bistable multivibrator circuit means, means for comparing the voltage charges accumulated by a storage counter of said first pair of storage counters and by a storage counter of said second pair of storage counters during one-half of the complete period of the oscillation of said astable multivibrator circuit means and means for comparing the accumulated voltages in the other storage counters of each pair during the other half of the period of vibration of said astable multivibrator circuit means whereby the average voltage differential so compared indicates the change in speed of said driven member during one interval.

2. The combination as set forth in claim 1 wherein each of said gates establishes a voltage pulse distribution circuit therethrough when the voltage pulse applied to its other input terminal is present, said distribution circuit being interrupted by said gate in response to a loss of the voltage pulse on said other input terminal.

3. The combination as set forth in claim 1 wherein said means for comparing the accumulated voltages in said storage counters comprises an output amplifier circuit having two input terminals and one output terminal, each of the input terminals being connected to a separate pair of storage counters whereby the output terminal is subjected to a voltage potential that is proportional to the difference in the voltage potentials supplied to the input terminals of the output amplifier circuit.

4. The combination as set forth in claim 2 wherein said means for comparing the accumulated voltages in said storage counters comprises an output amplifier circuit having two input terminals and one output terminal, each of the input terminals being connected to a separate pair storage counter whereby the output terminal is subjected to a voltage potential that is proportional to the difference in the voltage potentials supplied to the input terminals of the output amplifier circuit.

5. The combination as set forth in claim 1 wherein each storage counter comprises a storage capacitor, a charge dissipating circuit bypassing said capacitor, said bypass circuit being connected to the gate terminal associated with said storage counter that is subjected to a voltage of known frequency, the negative bias produced on said bypass circuit being dissipated when said storage counter registers its output signal, thereby conditioning said storage capacitor for a voltage accumulation mode as the voltage storing cycle is repeated.

6. The combination as set forth in claim 2 wherein each storage counter comprises a storage capacitor, a charge dissipating circuit bypassing said capacitor, said bypass circuit being connected to the gate terminal associated with said storage counter that is subjected to a voltage of known frequency, the negative bias produced on said bypass circuit being dissipated when said storage counter registers its output signal, thereby conditioning said storage capacitor for a voltage accumulation mode as the voltage storing cycle is repeated.

7. The combination as set forth in claim 3 wherein the bistable multivibrator circuit means has a single input which triggers a voltage impulse at each output side thereof in alternating sequence, said input side being connected to one of the output terminals of said first-mentioned multivibrator circuit means whereby the oscillating frequency of said bistable multivibrator circuit means is one-half of the vibrating frequency of said first-mentioned multivibrator circuit means.

8. The combination as set forth in claim 4 wherein the bistable multivibrator circuit means has a single input which triggers a voltage impulse at each output side thereof in alternating sequence, said input side being connected to one of the output terminals of said first-mentioned multivibrator circuit means whereby the oscillating frequency of said bistable multivibrator circuit means in one-half of the vibrating frequency of said first-mentioned multivibrator circuit means.

* * * * *